United States Patent [19]

Charrette

[11] Patent Number: 5,755,125
[45] Date of Patent: May 26, 1998

[54] APPARATUS AND METHOD FOR WHEEL IMMOBILIZATION

[76] Inventor: Leroy C. Charrette, 8469 Thoroughbred St., Alta Loma, Calif. 91701

[21] Appl. No.: 754,387

[22] Filed: Nov. 21, 1996

[51] Int. Cl.⁶ .................................................. B60R 25/00
[52] U.S. Cl. ........................ 70/226; 70/237; 410/19; 410/20
[58] Field of Search ................. 70/207, 209, 211, 70/212, 225, 226, 237, 238, 259, 260, 234; 180/287; 410/4, 19, 20, 21, 22, 30

[56] References Cited

U.S. PATENT DOCUMENTS

| 881,008 | 3/1908 | Knut | 410/19 X |
|---|---|---|---|
| 919,798 | 4/1909 | Weinacht | 410/22 |
| 1,149,006 | 8/1915 | Weaver | 70/237 X |
| 1,154,389 | 9/1915 | Fogalsang | 70/209 |
| 1,329,913 | 2/1920 | McGuire | 70/209 |
| 1,368,054 | 2/1921 | Recher | 70/212 |
| 1,395,532 | 11/1921 | Tilden | 70/209 |
| 2,107,331 | 2/1938 | Jandus et al. | 70/260 |
| 3,713,668 | 1/1973 | Flindt | 70/259 X |
| 4,031,726 | 6/1977 | De Jager | 70/226 |
| 5,450,736 | 9/1995 | Volkmar | 70/209 |
| 5,479,794 | 1/1996 | Rains | 70/237 X |
| 5,560,235 | 10/1996 | Aucoin | 70/209 X |

FOREIGN PATENT DOCUMENTS

| 204817 | 10/1920 | Canada | 70/212 |
|---|---|---|---|
| 533814 | 3/1922 | France | 70/212 |
| 919367 | 3/1947 | France | 70/212 |
| 611262 | 3/1935 | Germany | 70/212 |

*Primary Examiner*—Lloyd A. Gall
*Attorney, Agent, or Firm*—Leo R. Carroll

[57] ABSTRACT

The present invention provides a small vehicle wheel locking assembly which may be quickly installed over one or more wheels of the unit to be protected, and then locked or bolted to the truck or to an adjacent structure. The preferred embodiment comprises basic top and bottom enclosures in which the wheel of the mobile unit may be placed prior to closure of both assemblies into a box like enclosure. One side of the bottom enclosure is hinged to permit rolling the wheel into the enclosure, and one side of the top enclosure is hinged to aid in sliding the enclosure over the top of the wheel. When closed, the upper subassembly is interlocked with the lower unit and secured with a shielded padlock. The lower subassembly may be secured to the bed of a pickup truck, or to a stationary object. In this manner, the wheel is immobilized against rolling and sliding, and access is denied to all points of wheel or tire disassembly.

16 Claims, 4 Drawing Sheets

APPARATUS AND METHOD FOR WHEEL IMMOBILIZATION

BACKGROUND OF THE INVENTION

1. Technical Field

This invention relates generally to apparatus and methods for preventing theft of wheeled equipments, and especially to those smaller mobile systems such as air compressors, paint sprayers and other devices which may be easily stolen along with their locking apparatus.

2. Background Art

Wheel immobilization means have long been used to prevent accidental movement or theft of wheeled vehicles by simply rolling the vehicle away. Early solutions to these problems have included ground anchoring of wagon wheels as disclosed in U.S. Pat. No. 1,174,410 to Hajasok et al., spike anchoring of automobiles as shown by Setkowski in U.S. Pat. No. 1,396,067, and the improved chock of U.S. Pat. No. 2,960,857 to Winter.

Later anti-theft wheel locks have attacked the multiple problems of protecting the wheel removal means, the tire removal means and the locking mechanisms themselves. An example of solutions to these multiple problems may be seen in U.S. Pat. No. 3,695,071 to West, wherein multiple shields are provided to protect these vulnerable points.

Brakes have also been used for both restraint and as attachment points, as in U.S. Pat. No. 5,133,201 to LaMott et al for a vehicle wheel locking assembly, in which for both wheels having disc and those having drum braking systems may be secured.

Many other locking systems have been developed to deal with special applications, such as the Multi-axle Wheel Locking Bar of U.S. Pat. No. 4,688,408, to Shroyer, which addressed the problems of tandem wheel vehicles. Pickup trucks and their contents have received special attention from both thieves and from inventors. U.S. Pat. No. 5,303,969 for a Storage Device for a Pickup Truck, to Simnacher, and U.S. Pat. 4,733,898 for a Pickup-bed Secure Storage Unit; to Williams are recent examples. In these applications, tool protection is a high priority.

None of the above inventions are concerned with the problems of protecting wheeled equipments which are carried to job sites in the back of trucks, and operated nearby or from the back of the truck. Examples of these equipments include mobile systems such as air compressors, paint sprayers and similar devices. When operated in this environment, such equipment are susceptible to theft when the owner's attention is occupied with job site work, he is indoors, or he is on lunch or other breaks.

SUMMARY OF THE INVENTION

The present invention provides a small vehicle wheel locking assembly which may be quickly installed over one or more wheels of the unit to be protected, and then locked or bolted to the truck or to an adjacent structure. The preferred embodiment comprises basic upper or topsubassembly, and lower or bottom subassembly, within which the wheel of the mobile unit may be placed prior to closure of both assemblies into a box like enclosure. One side of the bottom enclosure is hinged at the bottom to permit rolling the wheel into the enclosure. One side of the top enclosure is hinged at the top to aid in sliding the enclosure over the top of the wheel if the assembly is made under an obstruction such as a fender. When closed, the upper subassembly is interlocked with the lower unit and secured with a padlock. The lower subassembly may be inside bolted to the pick up truck within the box prior to closure, and/or it may be chained to an outside stationary object. In this manner, the wheel is immobilized against rolling and sliding, and access is denied to all points of wheel or tire disassembly.

It is a prime object of the invention to provide three dimensional lockbox protection which prevents access to wheels, tires, lugs, bearings, brakes or any other wheel subassembly.

It is another object of the invention to provide a wheel locking device which can be easily utilized without modification of the equipment being protected.

It is a further object of this invention to provide a wheel locking device which may be inexpensively manufactured, and is structurally rigid and safe.

The above and other objects, features and advantages of the present invention will become more apparent from the following description when making reference to the detailed description and to the accompanying sheets of drawings.

DESCRIPTION OF THE PREFERRED EMBODIMENT

Figure 1:
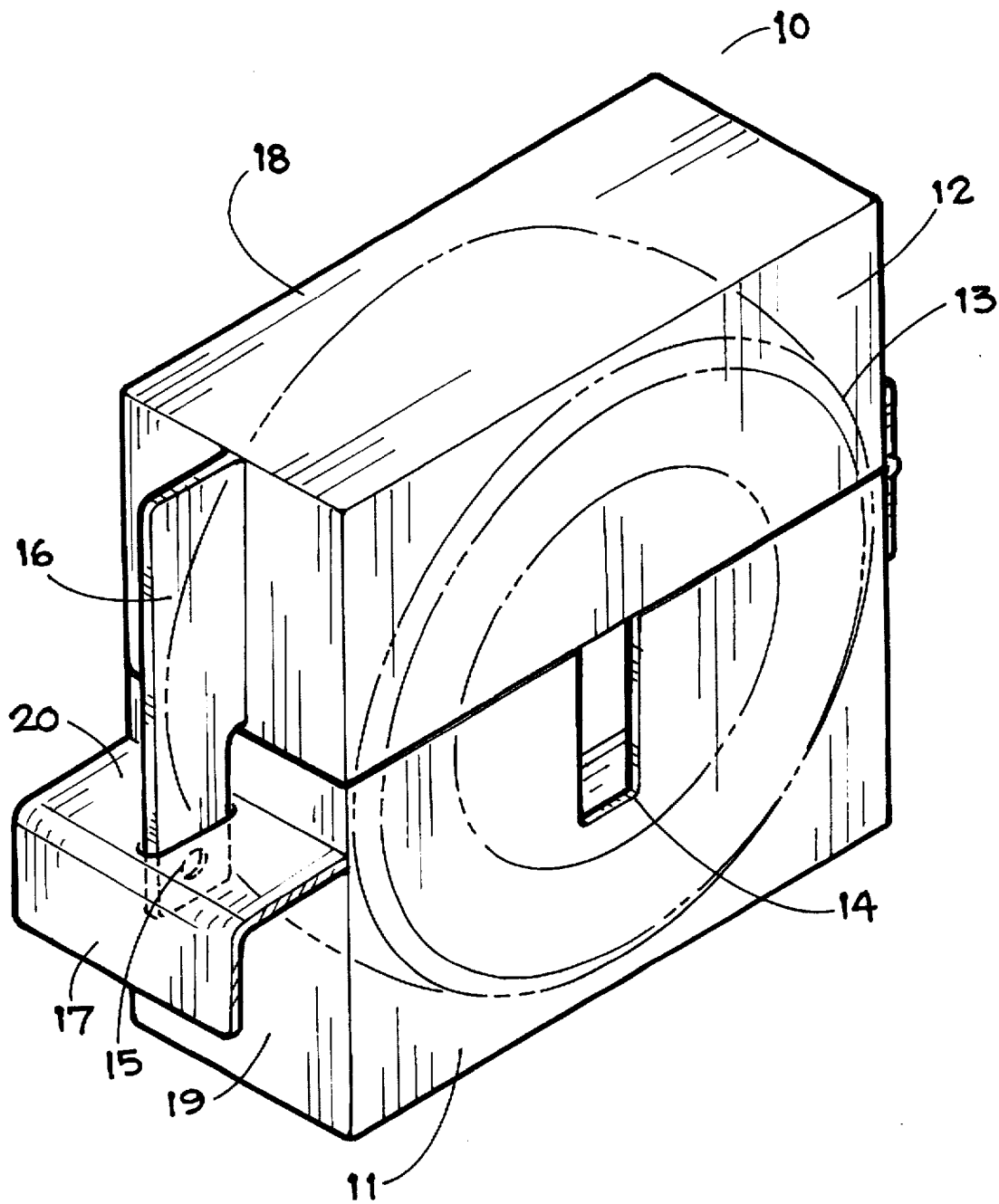
FIG. 1 is a front perspective view of the assembled locking device of this invention, with the protected wheel assembly shown in phantom.

FIG. 1 depicts a front perspective view of the assembled locking device 10 of this invention, with the protected wheel assembly 13 shown in phantom. Assembly 10 is comprised of two basic subassemblies, the lower subassembly 11 and the upper subassembly 12, which has a top 18. In the embodiment shown, the two units are sized to meet at a point just above the hub at the center of the wheel 13 being immobilized. Clearance notch means 14 is disposed on the inboard face 22 of the lower unit 11, so as to provide access for the inboard wheel axle, (not shown.)

Figure 2:
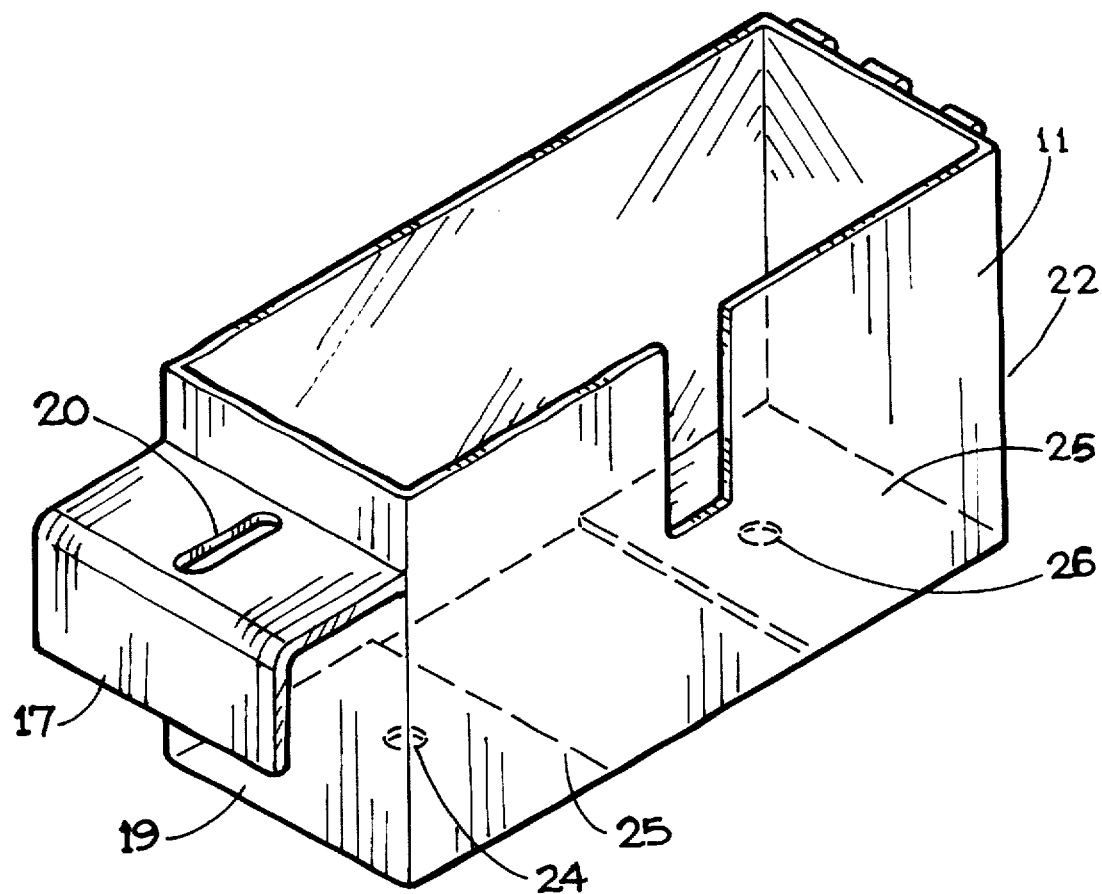
FIG. 2 shows a front perspective of the lower portion of the assembly of FIG. 1.
Figure 3:
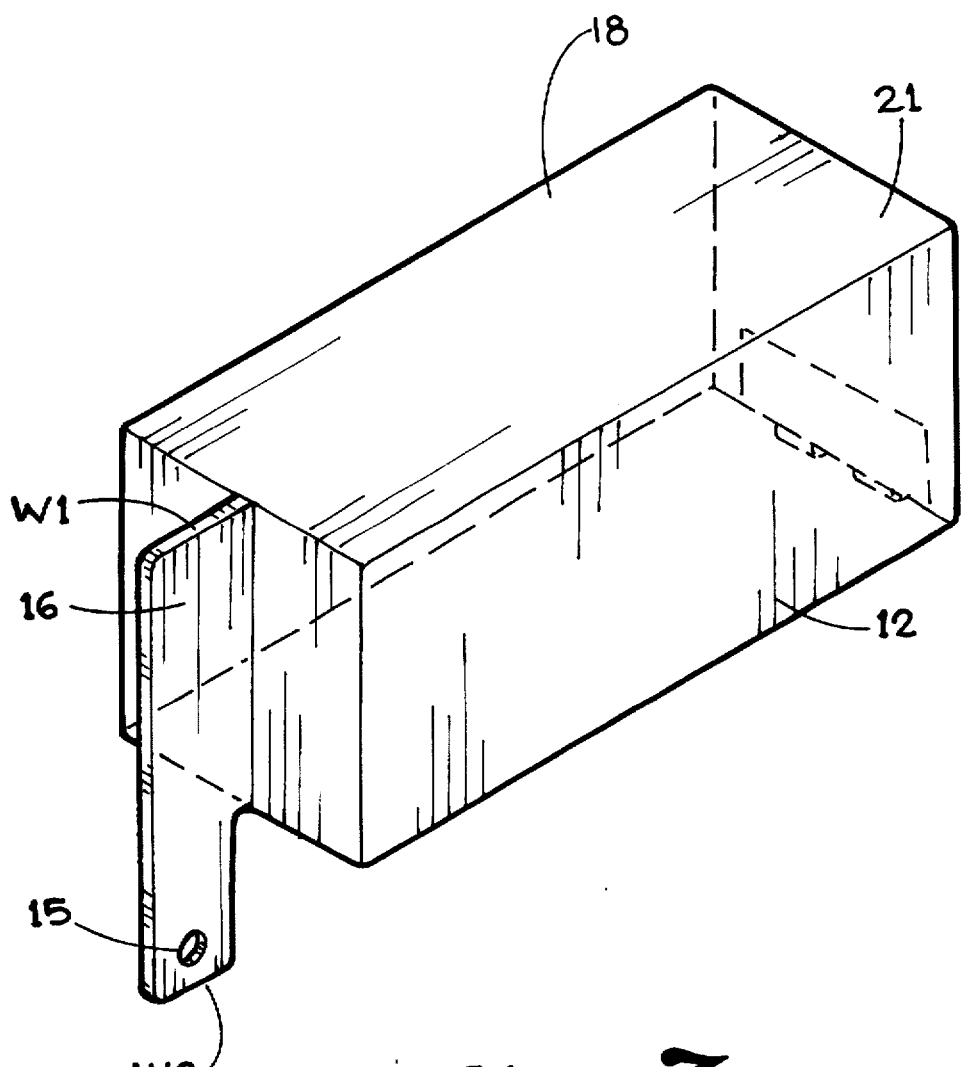
FIG. 3 shows a front perspective of the upper portion of the assembly of FIG. 1.

FIGS. 2 and 3 show perspective views of the lower subassembly 11 and upper subassembly 12 respectively. Referring to FIG. 2, receptacle plate 19 is attached by welding or other structural means to side wall 19' of bottom subassembly 11. Receptacle plate 19 has a single horizontal top portion and one or more vertical side portions. Bottom assembly 11 is supported by bottom flanges 25, which in turn have apertures 24 and 26 thereon for bolting to the bed of a truck.

Referring to FIG. 3, locking plate 16 is vertically disposed and attached by welding to side 12' of top subassembly 12. Locking plate 16 is configured with upper and lower portions, said upper portion having a width extending perpendicular from side 12' by a width W1, and said lower portion extending vertically below the bottom surface of top subassembly 12 and having a width W2 which is less than W1. Second aperture 15 is disposed on the lower portion of locking plate 16, and is sized to accommodate the diameter of the shackle of an ordinary padlock, (not shown)

Third aperture 20 is disposed upon the surface of receptacle plate 19 and has an opening shaped to permit passage of the cross section of the lower portion of locking plate 16 therethrough. The vertical length of lower portion of locking plate 16, and the placement of the second aperture thereupon, are selected so that the second aperture will be exposed below the lower surface of receptacle plate 19, so as to allow clearance for passage of the lock shackle through the second aperture. Receptacle plate 20 has a first side wall 17 extending downward below the surface of the receptacle plate. This side wall shields the padlock and helps prevent hacksaw or crowbar access.

Although the FIG. 2 shows the lower subassembly 11 with fixed side walls, it will be recognized that either front or back walls, or the opposite side wall could be made removable or hinged. This feature would permit sliding or rolling the wheel into the box, as opposed to lifting the equipment. Likewise, a hinged end wall 21 on the top subassembly 12, as is shown in FIG. 3, will permit easier installation of the top subassembly over the wheel in those equipments which might have reduced clearance between the wheel top and the equipment structure.

Figure 4:
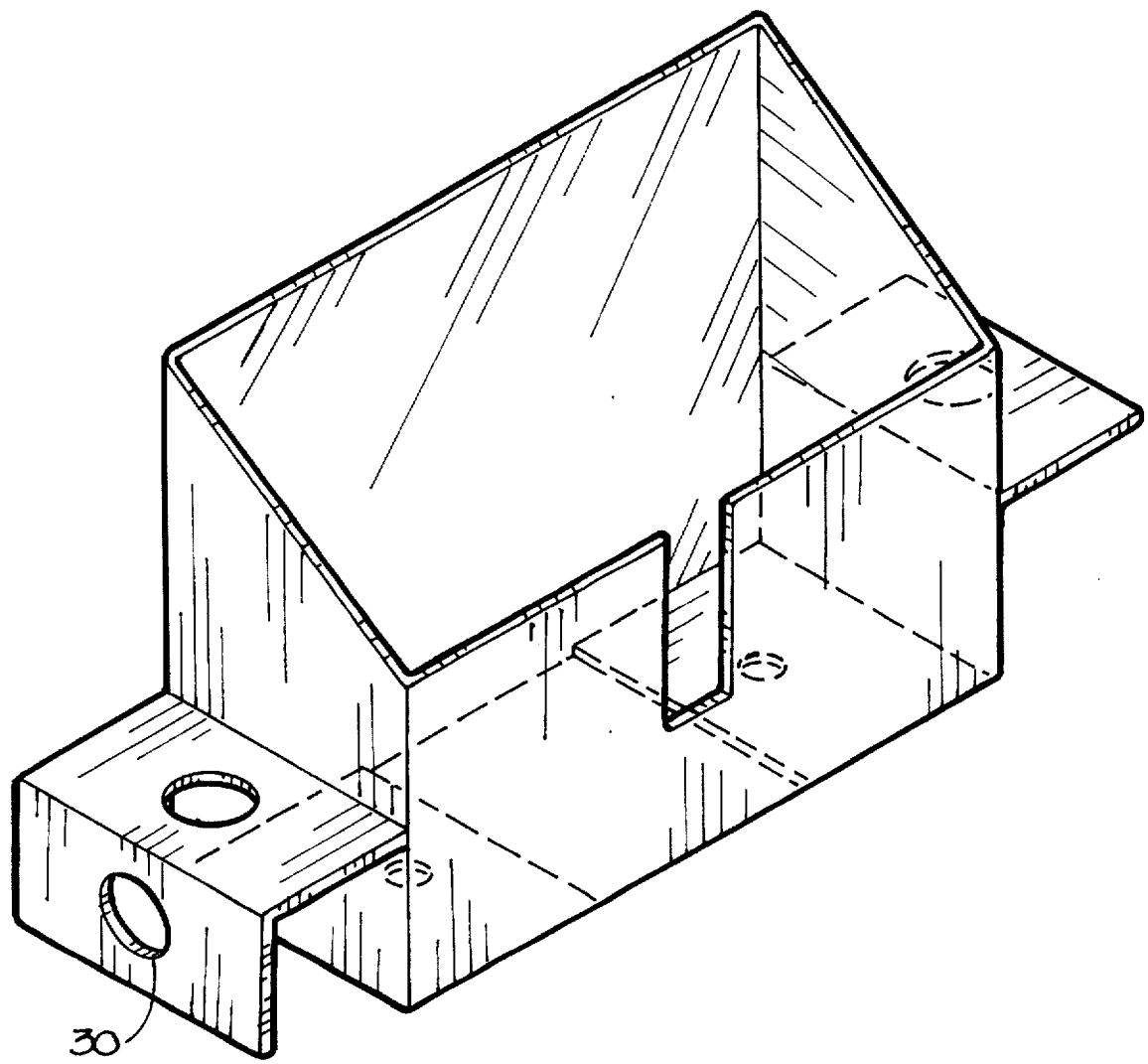
FIG. 4 depicts an alternate embodiment in which a modified lower portion is utilized with an open top.

In certain wheeled systems, fenders or the mounting of auxiliary equipments may prevent installation of the top subassembly without disassembly of the equipment to be locked. In this case an alternate embodiment comprising a lower unit only may still be used. In FIG. 4, such an embodiment is shown with a plurality of attachment apertures 30. With such an arrangement, chains may be intertwined through the holes and between the equipment and the truck bed or body.

The basic concepts of the techniques and apparatus for this invention have been illustrated herein and the spirit and scope of the appended claims should not necessarily be limited to those preferred versions.

I claim:

1. A wheeled equipment vehicle security device comprising:

first enclosure means having front, rear, end and bottom sides for covering the lower portion of at least one of the wheels on said wheeled equipment vehicle so as to restrain the wheel from rolling;

clearance notch means disposed on a top edge of the rear side of said first enclosure means so as to provide clearance for an axle of the restrained wheel;

first plate means attached to an end side of said first enclosure means, said plate means having a first aperture therein for securing said first enclosure means to an adjacent stationary body; and first locking means connected to said first aperture so as to prohibit movement of said wheeled equipment away from said adjacent stationary body.

2. The wheeled equipment vehicle security device as recited in claim 1, wherein one end side of said first enclosure means is bottom edge hinged to open to permit rolling insertion of the wheel to be restrained into said first enclosure means, the hinged side being made secure when closed.

3. The wheeled equipment vehicle security device as recited in claim 2, further comprising second enclosure means having front, rear, end and top sides for covering the upper portion of the wheel being restrained by said first enclosure means, said second enclosure means being sized and disposed to mate with said first enclosure means so as to cover the axle of the restrained wheel.

4. The wheeled equipment vehicle security device as recited in claim 3, wherein one end side of said second enclosure means is top edge hinged to permit lateral insertion of said second enclosure means over the wheel when open, and the hinged side being made secure when closed.

5. The wheeled equipment vehicle security device as recited in claim 4, further comprising second plate means attached to an end side of said second enclosure means, said second plate means having a second aperture disposed therein near an edge of said second plate means for securing said second enclosure means to said first enclosure means.

6. The wheeled equipment vehicle security device as recited in claim 5, wherein said first plate means is horizontally disposed normal to said end side of said first enclosure means in a plane parallel to the bottom side of said first enclosure means.

7. The wheeled equipment vehicle security device as recited in claim 6, wherein said second plate means is vertically disposed normal to the end side of said second enclosure means in a plane parallel to the front side of said second enclosure means.

8. The wheeled equipment vehicle security device as recited in claim 7, wherein the apertured end of said vertical plate means is sized to pass through the first aperture of said first plate means so as to permit securing of said second aperture below a horizontal surface of said first plate means.

9. The wheeled equipment vehicle security device as recited in claim 8, further comprising second locking means passing through the second aperture of said second plate means so as interlock said first and second enclosure means.

10. A method of securing a wheeled equipment vehicle, comprising the steps of:

providing a first enclosure means having front, rear, end and bottom sides for covering the lower portion of at least one of the wheels on said wheeled equipment vehicle so as to restrain the wheel from rolling;

cutting notch means on a top edge of the rear side of said first enclosure means so as to provide clearance for an axle of the restrained wheel;

attaching first plate means to an end side of said first enclosure means, said first plate means having a first aperture therein for securing said first enclosure means to an adjacent stationary body; and locking the first aperture so as to prohibit movement of said wheeled equipment away from said adjacent stationary body.

11. A method of securing a wheeled equipment vehicle as recited in claim 10, further comprising the steps of:

hinging a bottom edge of one end side of said first enclosure means to permit rolling insertion of the wheel to be restrained into said first enclosure means, the hinged side being made secure when closed.

12. A method of securing a wheeled equipment vehicle as recited in claim 11, further comprising the steps of:

providing a second enclosure means having front, rear, end and top sides for covering the upper portion of the wheel being restrained by said first enclosure means, said second enclosure means being sized and disposed to mate with said first enclosure means so as to cover the axle of the restrained wheel.

13. A method of securing a wheeled equipment vehicle as recited in claim 12, further comprising the steps of:

hinging a top edge of an end side of said second enclosure means to permit lateral insertion of said second enclosure means over the wheel when open, and the hinged side being made secure when closed.

14. A method of securing a wheeled equipment vehicle as recited in claim 13, further comprising the steps of:

attaching second plate means to an end side of said second enclosure means, said second plate means having a second aperture disposed therein near an edge of said second plate means for securing said second enclosure means to said first enclosure means.

15. A method of securing a wheeled equipment vehicle as recited in claim 14, further comprising the steps of:

disposing said first plate means horizontaly normal to said end side of said first enclosure means in a plane parallel to the bottom side of said first enclosure means;

disposing said second plate means vertically normal to the end side of said second enclosure means in a plane parallel to the front side of said second enclosure means; and passing the apertured end of said vertical plate means through the first aperture of said first plate means so as to permit securing of said second aperture below a horizontal surface of said first plate means.

16. A method of securing a wheeled equipment vehicle as recited in claim 14, further comprising the step of:

passing a locking means through the second aperture of said second plate means so as to interlock said first and second enclosure means.

* * * * *